J. Reist,

Wash Boiler:

No. 3662. Reissued Oct. 5. 1869.

Witnesses
Northrop & Stearns
Geo. H. Auble

Inventor
John Reist

N. PETERS, PHOTO-LITHOGRAPHER, WASHINGTON, D. C.

United States Patent Office.

JOHN REIST, OF PHILADELPHIA, PENNSYLVANIA.

*Letters Patent No.* 45,272, *dated November* 29, 1864; *reissue No.* 3,662, *dated October* 5, 1869.

IMPROVED WASH-BOILER.

The Schedule referred to in these Letters Patent and making part of the same.

*To all whom it may concern:*

Be it known that I, JOHN REIST, of the city of Philadelphia, State of Pennsylvania, have invented certain new and useful Improvements in the Manufacture of Portable Wash-Kettles or Boilers; and I do hereby declare that the following is a full description of the same.

My invention relates to the kind of boilers used in households for boiling the clothes preparatory to washing them; and its object is to prevent the boiling over of the water, which, if not constantly watched, and frequently stirred, results in carrying pieces of clothes over the edge of the boiler and burning them; also to quicken and promote the rapid circulation of the water in the boiler; also to prevent staining the clothes with iron-rust, by coming in contact with the raw edges of the perforations, of perforated false bottoms; and also for keeping all the clothes contained in the boiler equally hot and soaked, so that all portions are thoroughly boiled without the necessity of stirring, as needed with the ordinary boilers.

My invention will be readily understood from the accompanying drawings, forming a part of this specification, in which similar letters of reference allude to similar parts throughout, and in which—

Figure 1:
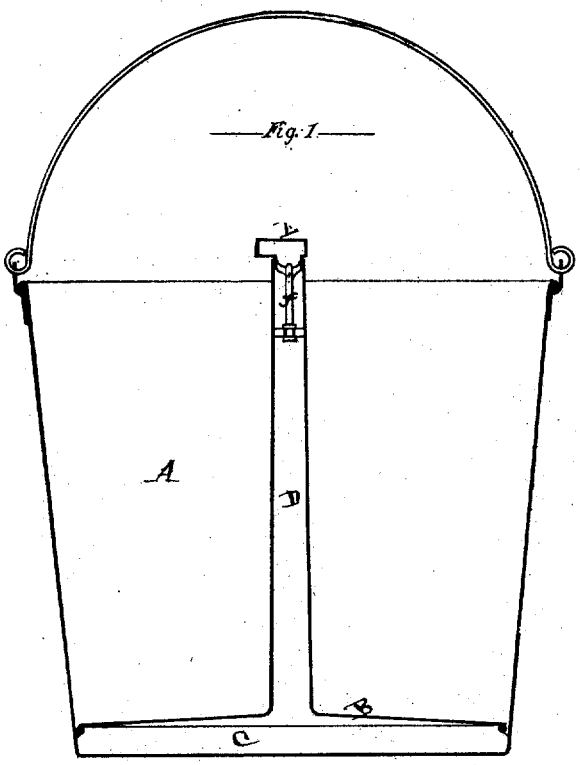
Figure 1 is a sectional elevation of the boiler.
Figure 2:
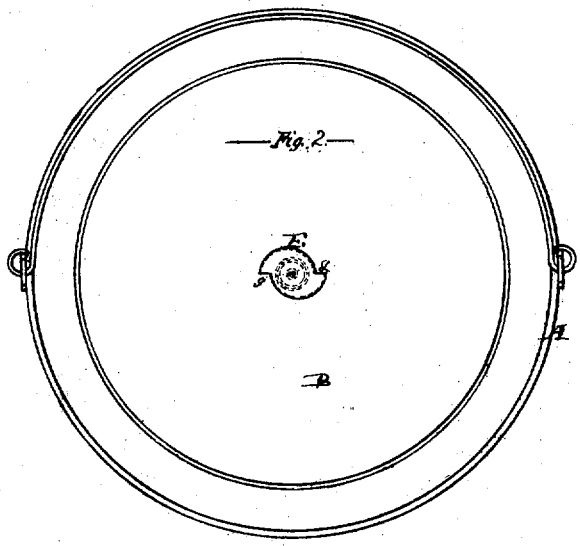
Figure 2 is a plan view of the same.

My invention consists in providing a wash-boiler, A, of any of the usual conformations, with a false bottom, B, arranged loosely in the boiler above the bottom proper, in such a manner that the water can pass down freely between or around the periphery of the false bottom, and sides of the boiler, into the water-space or chamber C beneath it.

This false bottom is made like a dish or solid cover, without any slots or perforations through it for water-passage ways, except for the insertion of one tube, D, or its equivalent, as may be required for communicating, at the bottom, with the space C, and extending up to the top of the boiler, for the purpose of transferring the boiling water from the chamber C to the upper side of the clothes, from thence to find its way back to the chamber C again, down through the marginal space around the periphery of the false bottom.

The object of making the false bottom like a dish, or a solid cover, and with only a marginal space between its edges and the sides of the boiler, for the downward current, of water to return to the chamber C, instead of through slotted gratings or perforations in false bottoms, is to quicken and keep up a more rapid circulation, with a less degree of heat than is possible with false bottoms, either perforated or slotted, by reason of compelling the expanding water and steam in the chamber to find their only escape through the upright tubes D, whereas, in perforated or slotted false bottoms, the expanding water and steam in the chamber, to a great extent, find an upward outlet through the numerous perforations, and thus prevents their quick and rapid ascent through the upright tubes attached thereto, unless kept up to the highest degree of boiling-heat.

Another object is to compel the boiling water in the chamber C in my boiler, to ascend always through the upright tubes, and thus prevent the clothes from being lifted, or forced out of the boiler, and over its edges, to fall on the stove and get burned, as is the case where perforated or slotted false bottoms are used. This is obvious, because, with a perforated or slotted false bottom, the expanding water and steam in the chamber C act through the numerous perforations against the under side of the body of clothes, in the upper chamber, and thus float or lift them up over the edges of the boiler, and to avoid this they have to be constantly watched and stirred down. But in my unperforated loosely-fitting false bottom, this is entirely obviated, because the water and steam cannot act against the under side of the clothes, but have to rise through the tubes, and by their constant flow over the upper surface of the clothes, and downward current through them, prevent all tendency to boil over the edges of the boiler.

And a further object is to guard against staining the clothes with iron-rust, as is the case with clothes coming in contact with the raw edges of the perforations in false bottoms, so made unless retinned, to prevent such stains.

In my loosely-fitting unperforated false bottom, this is entirely obviated, because there are no exposed raw edges of metal for the clothes to come in contact with, therefore not only preventing staining the clothes with iron-rust, but also saving the cost of perforating, and of perforating-machinery, as well also the cost of retinning, to prevent iron-rusting the clothes.

Letter E is a cap, attached to the top of the upright tube D, by means of an axis, *f*.

In the cap are provided two or more outlets, *g g*, so as to admit of the rising steam and boiling water escaping through them upon and over the upper surface of the clothes in the boiler.

It will be obvious that any other water-dispersing cap will answer an equally useful purpose, in combination with my special device of a loosely-fitting unperforated false bottom.

I therefore do not limit myself to the use of that particular device of a cap.

Having now described my invention, I will proceed to set forth what I claim, and desire to secure by Letters Patent of the United States, premising, however, that I do not claim the combination of either perforated, or slotted, or grating false bottoms with self-acting wash-boilers, as they have been previously known and used; but I do claim as my invention—

The combination of a loose-fitting solid or unperforated false bottom, B, having an upright tube, D, or equivalent, attached thereto, with a boiler, for the purposes hereinbefore described.

Also, the combination of the cap E, or an equivalent therefor, with the upright tube D and loosely-fitting unperforated false bottom B, for the purposes hereinbefore described.

JOHN REIST.

Witnesses:

NORMAN H. STEVENS,

WM. H. AUBLE.